United States Patent
Winkler et al.

[11] Patent Number: 5,811,066
[45] Date of Patent: Sep. 22, 1998

[54] METHOD AND DEVICE FOR SCRUBBING FLUE GASES

[75] Inventors: Hermann Winkler, Recklinghausen; Marion Neumann, Lünen, both of Germany

[73] Assignee: Steag Aktiengesellschaft, Essen, Germany

[21] Appl. No.: 849,325
[22] PCT Filed: Nov. 13, 1995
[86] PCT No.: PCT/EP95/04440
§ 371 Date: May 16, 1997
§ 102(e) Date: May 16, 1997
[87] PCT Pub. No.: WO96/15845
PCT Pub. Date: May 30, 1996

[30] Foreign Application Priority Data

Nov. 18, 1994 [DE] Germany ............ P 44 41 090.5

[51] Int. Cl.$^6$ ................ B01D 53/34; B01J 8/00
[52] U.S. Cl. ............ 423/210; 423/243.08; 423/245.1; 423/555; 422/168; 422/187; 422/234
[58] Field of Search ............ 423/210, 242.1, 423/244.07, 240 S, 240 R, 245.1, 555, 243.08; 422/168, 187, 234; 110/345

[56] References Cited

U.S. PATENT DOCUMENTS 5,618,508 4/1997 Suchenwirth et al. ............... 423/245.1

FOREIGN PATENT DOCUMENTS

| 0405290 | 1/1991 | European Pat. Off. . | |
|---|---|---|---|
| 2330578 | 1/1973 | Germany . | |
| 4123258 | 1/1993 | Germany . | |
| 50-33980 | 4/1975 | Japan | 423/243.08 |
| 50-159897 | 12/1975 | Japan | 423/555 |
| 56-108513 A | 8/1981 | Japan | 423/555 |
| 57-63117 A | 4/1982 | Japan | 423/555 |
| 4-45827 A | 2/1992 | Japan | 423/240 S |
| 9308902 | 5/1993 | WIPO . | |

*Primary Examiner*—Gary P. Straub
*Assistant Examiner*—Timothy C. Vanoy
*Attorney, Agent, or Firm*—Robert W. Becker & Associates

[57] ABSTRACT

In the method of scrubbing flue gases, the flue gases are wet-scrubbed in the presence of activated carbon. The activated carbon is separated from a suspension resulting from wet scrubbing. The activated carbon is then divided into a first and a second portion, and the first portion is thermally desorbed. The first portion of the activated carbon is returned to the second portion of the activated carbon. The first and second portions of the activated carbon are recirculated to the wet scrubbing step. The device for scrubbing flue gases includes a flue gas desulfurization scrubber with a flue gas inlet line, a flue gas outlet line, and an adsorption medium line. A treatment device for treating a suspension formed in the flue gas desulfurization scrubber is provided. A thermal desorption device for the activated carbon is provided. The treatment device includes a separator for separating solid material from the suspension. The treatment device further includes a flotation device having a gypsum outlet and an activated carbon outlet. The activated carbon outlet is connected to the adsorption medium line and to the thermal desorption device.

12 Claims, 1 Drawing Sheet

METHOD AND DEVICE FOR SCRUBBING FLUE GASES

This application is a national stage filing under 35 U.S.C. 371 of PCT/EP95/04440 filed 13 Nov. 1995.

BACKGROUND OF THE INVENTION

The invention relates to a method and a device for scrubbing flue gases of furnaces, whereby the flue gases are subjected to wet scrubbing with addition of activated carbon particles.

In refuse incinerators it is known from practice to reduce to a large extent the heavy metal contents of the flue gases with a series of wet scrubbing steps. Problems may occur in regard to mercury. A respective scrubbing process is therefore needed in order to comply with government regulations. They require at the time that the mercury contents be no greater than 50 $\mu g/m^3$. For heavy metal scrubbing, an activated carbon filter is provided upstream of the smoke stack which functions as a solid bed or fluid bed device. The required volume especially for a solid bed device is considerable. Furthermore, a comparatively high pressure loss occurs. Overall, a considerable investment and operating expenditure. Finally, a fire hazard, which should not be overlooked, is present. Furthermore, it is to be anticipated that in the future the allowable maximum contents of heavy metals, especially mercury, will be lowered.

For power plant furnaces the conditions are somewhat different. The flue gases generated here, when using German coal, contain mercury in an amount of 10 to 15 $\mu g/m^3$. At this time, there are no government regulations. However, in the future it is be counted on that these requirements will be tightened.

Active carbon filters can comply with these requirements only with the aforementioned disadvantages, whereby it must be taken into consideration that for refuse incinerators the produced amount of flue gases is comparatively small. The conditions are much more unfavorable for power plant furnaces which produce many times more flue gases. A filter would have to be dimensioned such that, in practice, it could not be tolerable with respect to the required space as well as with respect to the amount of pressure loss and the resulting costs.

The known method of the aforementioned kind (DE 41 23 258) provides a solution in that the activated carbon particles introduced into the wet scrubbing process reduce the heavy metal contents to such a great extent that heavy metals are no longer detectable in the flue gases exiting from the wet scrubbing process. This does not require an additional method step and requires only a minimal amount of expenditure with regard to the device technology. With respect to pressure loss, there are also no considerable disadvantages. Furthermore, an additional advantage is that the activated carbon particles, under the conditions of wet scrubbing, are able to not only bind heavy metals but also organic compounds such as dioxins and furanes.

The required amount of activated carbon particles is relatively small. However, it was found that it is desirable to lower the amount of adsorption medium even more because activated carbon is a relatively expensive material.

It is an object of the invention to reduce for scrubbing of flue gases the amount of activated carbon particles.

SUMMARY OF THE INVENTION

As a solution to this object the method of the present invention is characterized in that the activated carbon particles are separated from the suspension resulting from wet scrubbing and are recirculated into the wet scrubbing process whereby a portion the particles is branched off and thermally desorbed before recirculation.

The inventive method of scrubbing flue gases comprises the steps of:

a) wet scrubbing the flue gases in the presence of activated carbon;

b) separating the activated carbon from a suspension resulting from wet scrubbing;

c) dividing the activated carbon into a first and a second portion and thermally desorbing the first portion of the activated carbon;

d) returning the first portion of the activated carbon to the second portion of the activated carbon;

e) recirculating the first and second portions of the activated carbon to step a).

The method may further include the step of adjusting the treatment conditions for step a) to a pH of 6 by adding at least one pH-adjusting compound selected from the group consisting of slaked lime and limestone.

Step b) may include segregating gypsum and heavy metal-containing particles from the suspension by flotation.

Step b) may further include partially dehydrating the suspension before segregating.

The method may also include the steps of mixing at least one pH-adjusting compound, selected from the group consisting of slaked lime and limestone, into the activated carbon and introducing the mixture of activated carbon and at least one pH-adjusting compound into the flue gases upstream of the wet scrubbing step.

The method may further comprise the step of guiding the flue gases through a flue gas heat exchanger, wherein the mixture of activated carbon and at least one pH-adjusting compound is introduced into the flue gases upstream of the flue gas heat exchanger.

The first portion of activated carbon is mixed with the at least one pH-adjusting compound.

The invention also concerns a device for scrubbing flue gases. The inventive device is characterized by:

a flue gas desulfurization scrubber comprising a flue gas inlet line, a flue gas outlet line, and an adsorption medium line;

a treatment device for treating a suspension formed in the flue gas desulfurization scrubber;

a thermal desorption device for the activated carbon;

the treatment device including a separator for separating solid material from the suspension;

the treatment device further including a flotation device having a gypsum outlet and an activated carbon outlet;

the activated carbon outlet connected to the adsorption medium line and to the thermal desorption device.

The thermal desorption device has an outlet and the outlet is connected to the adsorption medium line.

The device may further comprise a mixing unit for mixing the activated carbon and at least one pH-adjusting compound selected from the group consisting of slaked lime and limestone, the mixing unit connected to the flue gas inlet line.

The device may comprise a flue gas heat exchanger connected upstream of the flue gas desulfurization scrubber, wherein the mixing unit is arranged upstream of the flue gas heat exchanger.

The thermal desorption device has an outlet connected to the mixing unit.

Surprisingly, it was found that the already relatively small amount of activated carbon, which is required for heavy metal removal, is spent only after numerous passes. By separating and desorbing a portion of the particles, it is possible to maintain a continuous circulation while reducing the consumption.

An especially advantageous course of the method results when wet scrubbing is adjusted to a pH of 6 by addition of milk of lime and/or limestone.

In an important further embodiment of the invention it is suggested to separate by flotation the suspension, resulting from wet scrubbing, into gypsum and heavy metal-containing particles, preferably after a previous partial dewatering step. The gypsum can then be used in a suitable commercial application.

Further considerable savings with regard to the adsorption medium results when the activated carbon particles are mixed with particles of slaked lime and/or limestone and the particle mixture is added upstream of the wet scrubbing step into the flue gases.

This method step is based on the recognition that, in general, a large portion of the expensive activated carbon for wet scrubbing is used due to the presence of the acidic components of the flue gases, such as $SO_2$, $SO_3$, HCL and HF. This is prevented by the particles of $Ca(OH)_2$, respectively, $CaCO_3$ added together with the activated carbon into the flue gas stream. They react in the gas phase with the acidic flue gas components and block them so that the activated carbon particles upon entry into the wet scrubbing step can completely fulfill their function, i.e., the bonding of heavy metals and of organic polutants. The additional savings with regard to activated carbon are at least 25%.

When using a flue gas heat exchanger upstream of the wet scrubbing step, the particle mixture is preferably added upstream of the flue gas heat exchanger into the flue gases. In heat exchangers the dew point of sulfuric acid is reached. $H_2SO_4$ condenses and can thus be increasingly adsorbed at the activated carbon particles in this form. When a regenerative heat exchanger is used, the passage of contaminants to the clean gas side is prevented.

A substantial improvement of the invention is suggested in that the desorbed activated carbon particles are recirculated for mixing with the particles of slaked lime and/or of lime stone. Thus, two recirculation flows results, one of which is directly guided into the wet scrubbing step while the other, which contains the desorbed particles, is guided to a mixing step with the particles of slaked lime, respectively, of limestone. The adsorption medium circulation can thus be maintained for a long period of time without any substantial addition of fresh material.

A selective catalytic oxidation can be provided upstream of the wet scrubbing step. The metallic vapors of $Hg^0$ coming from the furnace is oxidized to $Hg^{2+}$. In this form is enters the wet scrubbing step. When the selective catalytic oxidation is performed subsequent to wet scrubbing, which is also possible, then more $Hg^0$ reaches the wet scrubber. Also, the flue gases may be guided, before wet scrubbing, through an air preheater and an electric filter.

An especially advantageous embodiment of a device for performing the inventive scrubbing process is provided with a flue gas desulfurization scrubber having gas inlet and gas outlet lines as well as an adsorption medium line and connected to a device for post treatment of the suspension resulting from wet scrubbing. This device is characterized in that the device for post-treating the suspension is a device for separating the solid particles from the suspension to which is connected a flotation unit with a gypsum outlet and an outlet for activated carbon particles. The outlet for activated carbon particles is connected to the adsorption medium line of the flue gas desulfurization scrubber as well as to a thermal desorption device.

In a further embodiment of this device, a mixing device for activated carbon particles and particles of slaked lime and/or limestone is provided which is connected to the gas inlet line of the flue gas desulfurization scrubber. Advantageously, the outlet of the thermal desorption device is connected to the mixing device.

It may also be advantageous to arrange the mixing device upstream of the flue gas heat exchanger positioned upstream of the flue gas desulfurization scrubber.

BRIEF DESCRIPTION OF THE DRAWINGS

The invention will be explained in more detail in the following with the aid preferred embodiments in conjunction with the attached drawings. The drawing shows in:

DESCRIPTION OF PREFERRED EMBODIMENTS

Figure 1:
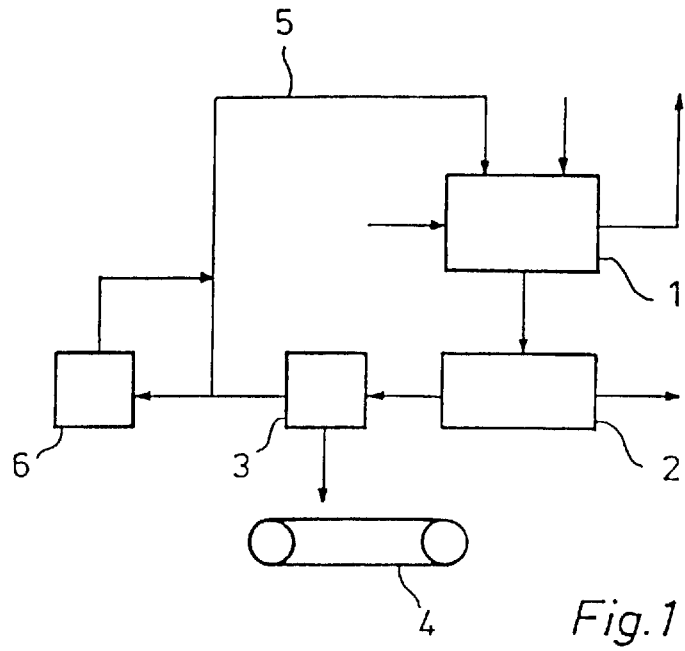
Figure 2:
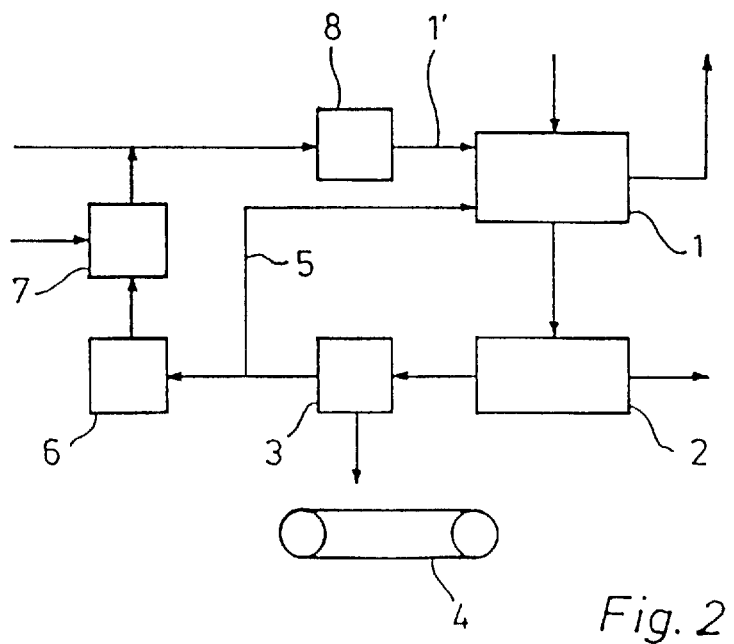

FIG. 1 a flow chart of a first inventive device;

FIG. 2 a flow chart of a second inventive device;

The device according to FIG. 1 comprises a flue gas desulfurization scrubber 1 which is supplied via a gas inlet line 1' from the left with flue gases to be scrubbed. At the top of the flue gas desulfurization scrubber 1, milk of lime is introduced. Furthermore, the flue gas desulfurization scrubber 1 is supplied with activated carbon particles on which the heavy metals and organic polutants contained within the flue gases are deposited.

The suspension produced within the flue gas desulfurization scrubber 1 is guided in a hydrocyclone 2 whose solid material outlet is connected to a flotation device 3. Here, the activated carbon particles are separated from gypsum. The latter is guided in a conventional manner to a belt filter 4, respectively, any other suitable dewatering device.

The outlet for activated carbon particles of the flotation device 3 is connected via a line 5 to the flue gas desulfurization scrubber 1. A portion of the activated carbon particles is introduced into a thermal desorption device 6 and is freed therein from heavy metals. The desorbed activated carbon particles are also returned into the flue gas desulfurization scrubber 1 via line 5.

The device according to FIG. 2 differs from the device of FIG. 1 essentially in that a mixing device 7 is provided which serves to mix the activated carbon particles with particles of slaked lime and/or limestone. This particle mixture is then introduced into the gas inlet line 1' of the flue gas desulfurization scrubber 1. The particles of slaked lime, respectively, limestone, react with acidic components of the flue gases and prevent them from reaching with the activated carbon particles the wet scrubbing step. The activated carbon particles are thus fully able to adsorb heavy metals, especially mercury, and also organic contaminants in the wet scrubbing step.

Furthermore, FIG. 2 shows a flue gas heat exchanger 8 which is arranged between the mixing device 7 and the flue gas desulfurization scrubber 1. Within the heat exchanger 8 condensation of sulfuric acid takes place, followed by a subsequent reaction with the particles of slaked lime, respectively, limestone.

Further developments and deviations are possible within the gist of this application. For example, the mixing device 7 can also be supplied from an external source with activated carbon particles. Furthermore, in the arrangement according to FIG. 2 the heat exchanger can be omitted.

The present invention is, of course, in no way restricted to the specific disclosure of the specification and drawings, but also encompasses any modifications within the scope of the appended claims. pg,9

What we claim is:

1. A method of scrubbing flue gases comprising the steps of:
   a) wet scrubbing the flue gases with a calcium based scrubbing solution containing activated carbon for the removal of heavy metals and hydrocarbons out of the flue gas;
   b) separating the activated carbon from the suspension resulting from wet scrubbing;
   c) dividing the activated carbon into a first and a second portion and thermally desorbing heavy metals from the first portion of the activated carbon;
   d) returning the first portion of the activated carbon to the second portion of the activated carbon;
   e) recirculating the first and second portions of the activated carbon to step a).

2. A method according to claim 1, further including the step of adjusting the treatment conditions for step a) to a pH of 6 by adding at least one pH-adjusting compound selected from the group consisting of slaked lime and limestone.

3. A method according to claim 1, wherein step b) includes segregating gypsum and heavy metal-containing particles from the suspension by flotation.

4. A method according to claim 3, wherein step b) includes partially dehydrating the suspension before segregating.

5. A method according to claim 1, further including the steps of mixing at least one pH-adjusting compound, selected from the group consisting of slaked lime and limestone, into the activated carbon and introducing the mixture of activated carbon and at least one pH-adjusting compound into the flue gases upstream of the wet scrubbing step.

6. A method according to claim 5, further including the step of guiding the flue gases through a flue gas heat exchanger, wherein the mixture of activated carbon and at least one pH-adjusting compound is introduced into the flue gases upstream of the flue gas heat exchanger.

7. A method according to claim 5, wherein the first portion of activated carbon is mixed with the at least one pH-adjusting compound.

8. A device for scrubbing flue gases, said device comprising:
   a flue gas desulfurization scrubber comprising a flue gas inlet line, a flue gas outlet line, and an adsorption medium line;
   a treatment device for treating a suspension formed in said flue gas desulfurization scrubber;
   said treatment device including a separator for separating solid material from the suspension;
   said treatment device further including a flotation device having a gypsum outlet and an activated carbon outlet;
   a thermal desorption device for the activated carbon;
   said activated carbon outlet connected to said scrubber and to said thermal desorption device.

9. A device according to claim 8, wherein said thermal desorption device has an outlet and wherein said outlet is connected to said scrubber.

10. A device according to claim 8, further comprising a mixing unit for mixing the activated carbon and at least one pH-adjusting compound selected from the group consisting of slaked lime and limestone, said mixing unit having its outlet connected to said flue gas inlet line.

11. A device according to claim 10, further comprising a flue gas heat exchanger connected upstream of said flue gas desulfurization scrubber, wherein said mixing unit outlet being connected to the flue gas inlet line upstream of said flue gas heat exchanger.

12. A device according to claim 10, wherein said thermal desorption device has an outlet connected to said mixing unit.

* * * * *